United States Patent [19]

Mizuno

[11] Patent Number: 5,181,671
[45] Date of Patent: Jan. 26, 1993

[54] PHOTOGRAPHIC FILM CASSETTE

[75] Inventor: Kazunori Mizuno, Minami-Ashigara, Japan

[73] Assignee: Fuji Photo Film Co., Ltd., Kanagawa, Japan

[21] Appl. No.: 732,027

[22] Filed: Jul. 18, 1991

[30] Foreign Application Priority Data

Jul. 25, 1990 [JP] Japan ................................. 2-196875

[51] Int. Cl.⁵ ............................................. G03B 17/26
[52] U.S. Cl. ................................................. 242/71.1
[58] Field of Search ...................... 242/71.1, 71, 71.2, 242/71.7; 206/389, 409; 354/275, 276, 277

[56] References Cited

U.S. PATENT DOCUMENTS

| | | |
|---|---|---|
| 2,336,278 | 12/1943 | Mihalyi . |
| 2,360,255 | 10/1944 | Mihalyi . |
| 2,364,381 | 12/1944 | Miahlyi . |
| 2,476,996 | 7/1949 | Nebel ................................. 242/71.1 |
| 2,521,935 | 9/1950 | Monroe . |
| 2,552,200 | 5/1951 | Mihalyi . |
| 3,333,785 | 8/1967 | Baur et al. ........................... 242/71.1 |
| 3,356,311 | 12/1967 | Winkler et al. ..................... 242/71.1 |
| 3,467,340 | 9/1969 | Rosenburgh . |
| 3,556,435 | 1/1971 | Wangerin . |
| 3,627,229 | 12/1971 | Wangerin . |
| 3,627,230 | 12/1971 | Wangerin . |
| 3,677,499 | 7/1972 | Wangerin . |
| 3,797,777 | 3/1974 | Hosono et al. . |
| 4,832,275 | 5/1989 | Robertson . |
| 4,834,306 | 5/1989 | Robertson et al. . |
| 4,846,418 | 7/1989 | Fairman . |
| 4,887,776 | 12/1989 | Niedospial, Jr. et al. ......... 242/71.1 |
| 4,962,401 | 10/1990 | Takahashi . |
| 5,003,334 | 3/1991 | Pagano et al. . |

FOREIGN PATENT DOCUMENTS

| | | |
|---|---|---|
| 2921379 | 11/1980 | Fed. Rep. of Germany . |
| 50-33831 | 4/1975 | Japan . |
| 57-190948 | 11/1982 | Japan . |
| 1-102458 | 4/1989 | Japan . |
| 0027333 | 1/1990 | Japan .................................. 242/71.1 |

Primary Examiner—Stanley N. Gilreath
Attorney, Agent, or Firm—Sughrue, Mion, Zinn, Macpeak & Seas

[57] ABSTRACT

A cassette shell of a photographic film cassette is made of resin. A photographic film is wound on a spool rotatably contained in the cassette shell. A port portion has a passageway for passing the film therethrough toward the outside of the cassette shell. A plush within the passageway for trapping light coming through the passageway is provided in such a manner so as to be removable from the cassette shell when the cassette shell is subjected to a process for reuse thereof. In one embodiment, the port portion is removably attached to the cassette shell. In another embodiment, the light trapping member is adhered to the portion with an adhesive agent soluble in a solvent in which the cassette shell is insoluble.

7 Claims, 3 Drawing Sheets

PHOTOGRAPHIC FILM CASSETTE

BACKGROUND OF THE INVENTION

1. Field of the Invention

The present invention relates to a photographic film cassette, and more particularly to a film cassette having a cassette shell that is molded from a resin.

2. Description Relative to the Prior Art

A film cassette is constituted by a cassette shell, a spool contained in the cassette shell and photographic film wound around the spool. The used film cassette is unloaded from a camera and forwarded to a photolaboratory, where the exposed film is removed from the cassette shell and developed. The cassette shell is then thrown away.

It is known to provide a film cassette with a film leader that does not protrude from the cassette shell prior to loading and which is thus easily loaded into a camera. Rotation of the spool in the direction of unwinding the film by means of the camera's film feeding mechanism causes the film leader to emerge outside of the cassette through a film passageway. Film cassettes of this type are disclosed in U.S. Pat. Nos. 4,832,275, 4,834,306 and 4,846,418. A cassette shell used for such a film cassette requires a construction provided with annular ridges for contact with the outermost turn of the film wound in a roll in order to prevent the film from loosening and a separating claw for separating the film leader from the outermost turns of the film. The cost for manufacturing such a construction can be reduced by molding the cassette shell from resin as described in Japanese Patent Laid-open Publication Nos. 50-33831 and 57-190948 so as to form the annular ridges and the separating claw integrally with the cassette shell.

General resin products are scarcely susceptible to natural decomposition, so they must be subjected to treatment as industrial waste in order to dispose of them. Film cassettes made of resin constitute a problem because of the very high cost of treatment for disposal of the cassettes, particularly in view of the great number of film cassettes that are constantly consumed. Film cassettes having a resin cassette shell made of a material that is soluble in water or is susceptible of microbial degradation have been proposed, as described in Japanese Patent Laid-open Publication No. 1-102458 and a Japanese patent application filed by the present applicant.

Although it is an advantage, from the standpoint of treatment for disposal, to make cassette shells from a material that is soluble in water or is susceptible of microbial degradation, such cassette shells nonetheless represent a great waste of resources because the material from which they are made is incapable of being recycled.

If a general resin of a low decomposability is molded into a cassette shell, withdrawn and fused for its reuse, there will be problems due to the deterioration of purity of the resin. This is because the resin is mixed with ink, labels and adhesive agents even when subjected to a newly fusing treatment. The surface of the cassette shell is provided with a label adhered thereto providing an indication of the film type, manufacturer and the like. The labels are not easily removable from the cassette shell. On account of a deterioration in the purity of the resin, a change in fluidity of the resin to be melted gives rise to several problems, such as, failure in injection molding of the cassette shell and low intensity of the recycled resin of cassette shell.

SUMMARY OF THE INVENTION

It is therefore an object of the present invention to provide a photographic film cassette having a resin molded cassette shell which can be melted and remolded after withdrawing it.

It is another object of the present invention to provide a photographic film cassette wherein the impurities stuck on the cassette shell can be easily removed.

In order to achieve the above and other objects and advantages of this invention, a photographic film cassette comprises: a cassette shell made of resin; a spool on which a photographic film is wound and which is rotatably contained in the cassette shell; a port portion having a passageway for passing the film therethrough toward the outside of the cassette shell; and a light trapping member provided with the passageway for trapping light coming through the passageway; said member being removable from the cassette shell when the cassette shell is subjected to a process for reuse thereof.

In a preferred embodiment, the port portion is removably attached to the cassette shell. In another preferred embodiment, the light trapping member is adhered to the port portion with an adhesive agent soluble in a solvent in which the cassette shell is insoluble. Thus the resin molded into a cassette shell can be reused after withdrawing it, whereas the impurity stuck on a cassette shell can be easily removed.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
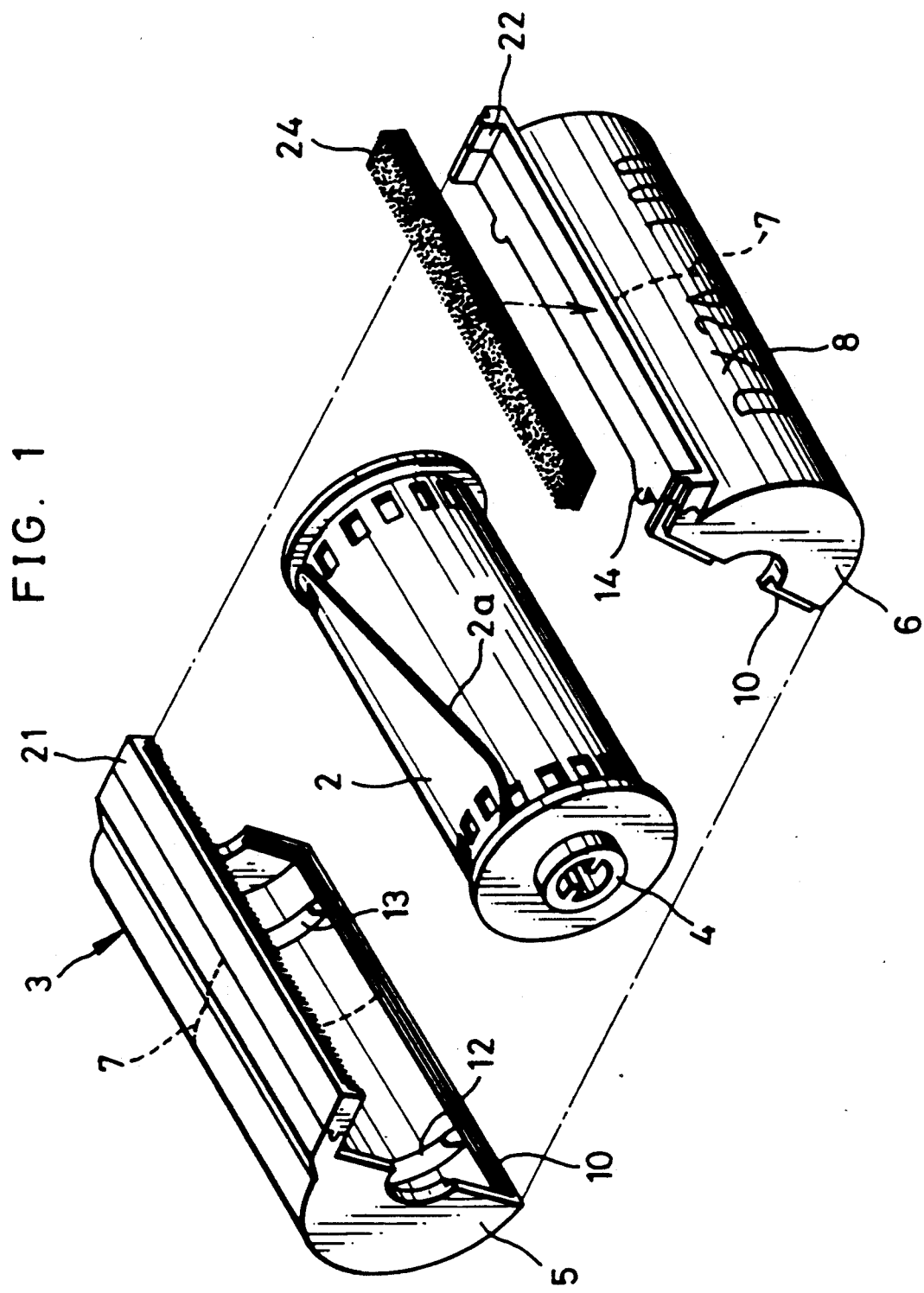
FIG. 1 is an exploded perspective view illustrating a photographic film cassette according to a first preferred embodiment of the present invention.

In FIG. 1 illustrating a first preferred embodiment of a photographic film cassette according to the present invention, the film cassette consists of photographic film 2 and a cassette shell 3 for containing the film 2 in light-tight fashion. The film 2 is wound about a spool 4, which is rotatably supported in the cassette shell 3, which consists of a pair of shell halves 5 and 6 to be fitted together. The shell halves 5 and 6, having lateral sides $5^1$ and $6^1$, are molded from polystyrene resin of a light shielding characteristic. Each of the shell halves 5 and 6 is molded by using a mold having two inlets or gates, so that a weld line 7 indicated by the broken line is formed on the surfaces of the shell halves 5 and 6 along the circumference.

A literal indication 8 illustrating a type of the film 2, including a maximum number of photographable frames and a film sensitivity, is printed on the periphery of the lower shell half 6. The literal indication 8 is printed by using ink of which a principal component is an acrylic resin, and solvent diluent is methanol. The ink after printing is dried for 5 minutes at 100° C. The ink includes no hardening agent and can be easily removed by washing it with methanol. Other materials of the ink are phenolic resin, urea alkyd resin, melamine alkyd resin, amino alkyd resin, vinyl butyral resin and the like.

Figure 2:
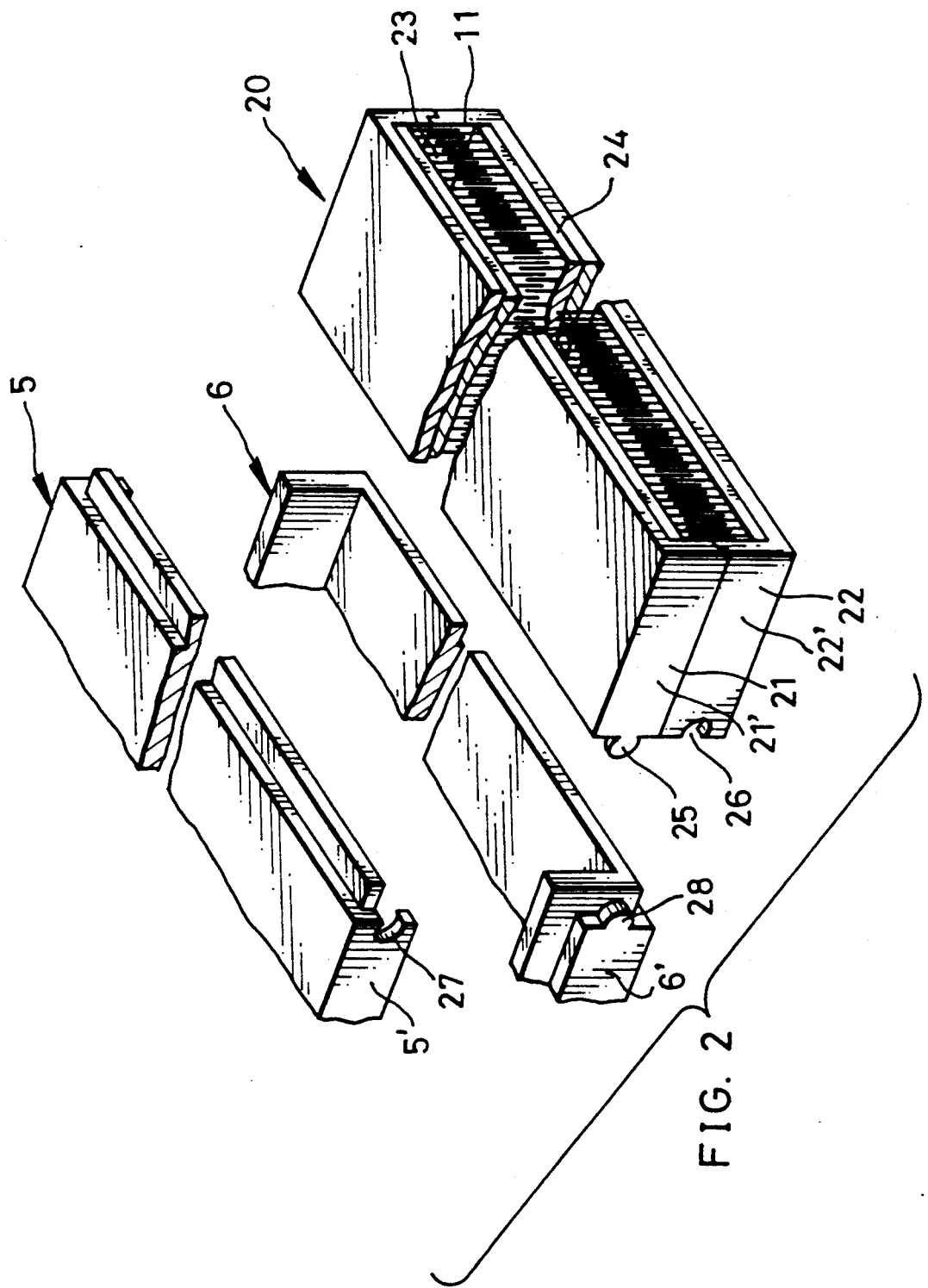
FIG. 2 is a perspective view illustrating an important portion of the film cassette illustrated in FIG. 1.

The edges of the shell halves 5 and 6 to be fitted together are stepped edges 10 which serve to shield light from the inside of the cassette shell 3 and are welded together by ultrasonic welding. A film passage mouth 11 as illustrated in FIG. 2 is formed between the welded shell halves 5 and 6 along the lengthwise direction. A pair of annular ridges 12 and 13 are integrally formed on the inner surfaces of the shell halves 5 and 6 and are in contact with the surface of the outermost turn of the film 2 to prevent it from loosening. A leading end 2a of the film 2 is to be rotated in accordance with the rotation of the spool 4 by means of the annular ridges 12 and 13. A separating claw 14 is formed on a lower end of the annular ridge 12 of the lower shell half 6, and separates the leading end 2a from the outer turns of the film 2 to advance the leading edge to the film passage mouth 11.

In FIG. 2 illustrating a port portion 20 defining the film passage mouth 11, the port portion 20 consists of upper and lower covering members 21 and 22 in the shape of a square bracket having lateral sides 21$^1$ and 22$^1$, which define a film passageway 23. A plush or light trapping fabric 24 is attached to the inner surfaces of the upper and lower covering members 21 and 22. A coupling means comprises a first projection 25 and a first recess 26 formed respectively on the lateral sides 21$^1$ and 22$^1$ of the covering members 21 and 22, and are coupled with a second recess 27 and a second projection 28 of the coupling means formed on the lateral sides 5$^1$ and 6$^1$ of the shell halves 5 and 6.

The handling of the above-constructed film cassette following exposure of the film will now be described. The film cassette is unloaded from its camera after exposing all of the film frames and forwarded to a photofinishing agency for processing. Film cassettes collected by the photofinishing agency are brought to a photolaboratory. An operator of the photolaboratory rotates the spool 4 to advance the leading end 2a to the outside of the cassette shell 3. The film 2 is then fully removed from the cassette shell 3 by use of an automatic withdrawing machine.

The port portion 20 is pulled and detached from the cassette shell 3. The cassette shell 3 is broken along the weld line 7 to take out the spool 4. The shell halves 5 and 6 are washed with methanol, so that the literal indication 8 is washed away because the ink is dissolved in the methanol which is its solvent diluent. With the impurities thus removed, the shell halves 5 and 6 are dried, heated, melted, and cooled to form pellets of pure polystyrene. The pellets thus obtained can be reused as a material for molding shell halves of cassette shells. It is noted, that the literal indication 8 may be provided on the port portion 20, thereby eliminating the need for washing the shell halves with methanol.

Figure 3:
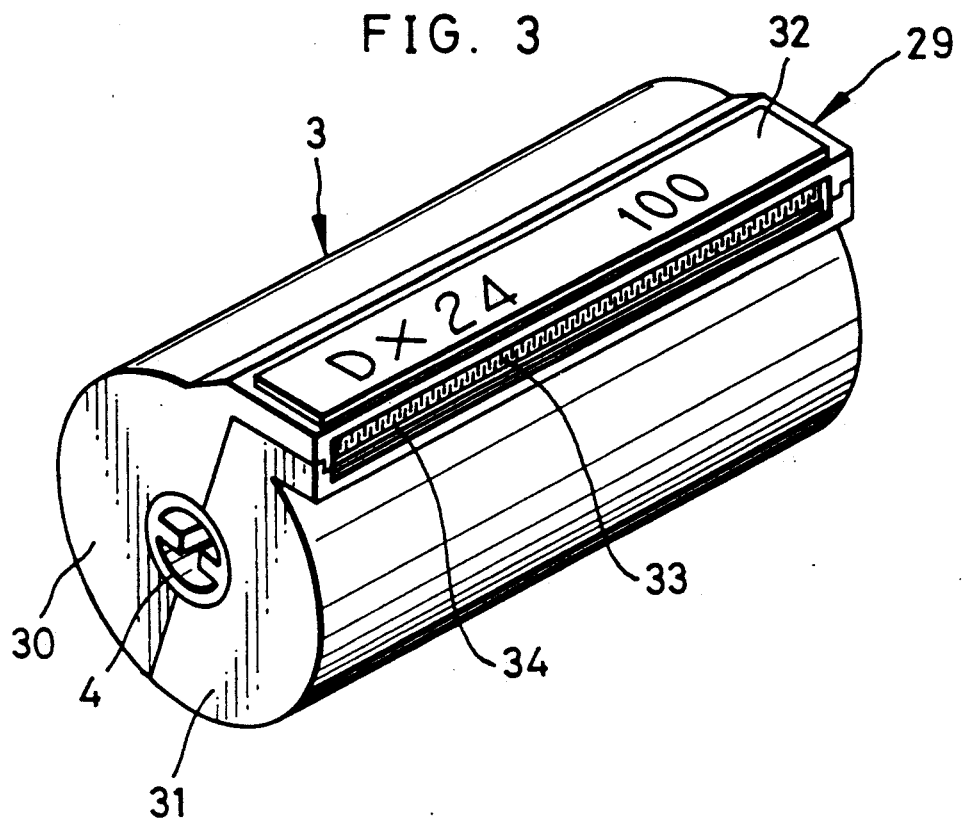
FIG. 3 is a perspective view illustrating a photographic film cassette according to a second preferred embodiment of the present invention.

Referring to FIG. 3 illustrating a second preferred embodiment according to the present invention, the upper and lower members forming the port portion are formed integrally with shell halves 30 and 31 forming the cassette shell 3. A paper label 32 is adhered to the outer surface of the upper shell half 30 by means of polyvinyl alcohol adhesive agent and carries an indication of a maximum number of photographable frames and a film sensitivity to indicate the type of the film to a user. Because the polyvinyl alcohol adhesive agent is soluble in heated water, the paper label 32 is removed from the upper shell half 30 when the upper shell half 30 is washed with heated water. The adhesion of the paper label 32 may be performed with casein, glue, cellulose, starch, dextrin, gum arabic, sodium silicate and the like. It is preferable, in order to prevent the paper label 32 from being detached during ordinary use, to apply an adhesive agent insoluble in water cooler than 70° C. More preferably, an adhesive agent of a higher molecular weight can be used, as insoluble in water still hotter than 70° C. In another case, an alkali-soluble label can be used (Belland film and Belland adhesive agent manufactured by Belland Co. Ltd.). This label is soluble in alkali water solution.

A plush 33 woven from nylon is adhered to the film passageway 23 in the port portion 29 by use of an acrylic adhesive tape 34. The adhesive agent provided on the surface of the adhesive tape 34 is soluble in a solvent of acetone. Other solvents can be used, for example, propanol, hexane, toluene, and diacetone alcohol. The back surface of the plush 33 is coated with acrylic sealer, whereas both upper and lower surfaces of the film passageway 23 are coated with silicone oil, which keeps the adhesion between the adhesive tape 34 and the film passageway 23 weaker than the adhesive tape 34 and the plush 33. In another case, a plush 33 is adhered by adhesive agent which is soluble in alkali water solution (for example, KBC 4120 DA manufactured by Belland AG Co., Ltd.) The plush 33 can be removed in alkali water solution, for example 10% sodium carbonate water solution.

When the film cassette as constructed above is brought in the photolaboratory, the spool 4 is rotated to advance the leading end 2a to the outside of the cassette shell 3. The film 2 is then completely removed from the cassette shell 3 by use of an automatic withdrawing machine. A tip of a screwdriver is inserted in the film passageway 23 to separate the cassette shell 3 into two along the juncture 10, from which the spool 4 is removed. When the plush 33 is pulled with a tool such as pliers, the adhesive tape 34 as well as the plush 33 is pulled away from the cassette shell 3. The shell halves 30 and 31 are then washed with the solvent to wash away the adhesive agent still stuck to the shell halves 30 and 31 after removing the adhesive tape 34.

Figure 4:
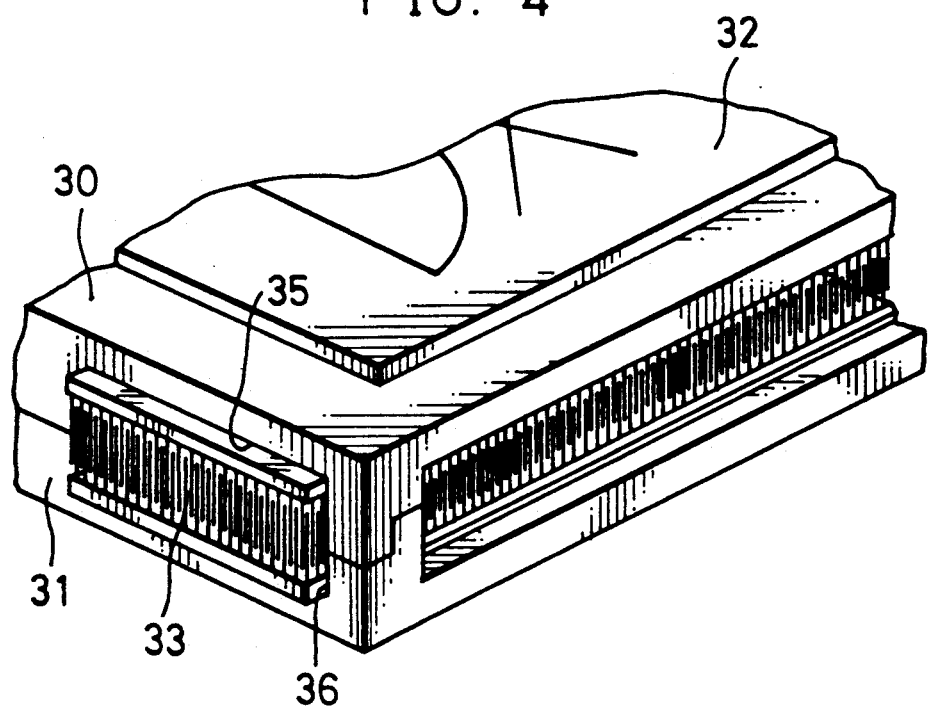
FIG. 4 is a perspective view illustrating an important portion of a photographic film cassette according to a third preferred embodiment of the present invention.

As shown in FIG. 4, recesses 35 and 36 can be formed on a lateral side of the shell halves 30 and 31, through which a lateral end of the plush 33 is exposed to the outside. This makes it possible to remove the plush 33 easily by pulling this end with a pliers without disassembling or breaking the cassette shell 3.

When the shell halves 30 and 31 are washed in heated water at 90° C. under agitation for 20 minutes, the paper label 32 drops from the shell half 30. The shell halves 30 and 31 are then washed with water at ordinary temperature, dried with heated air, heated, melted and cooled to become pellets of polystyrene similar to the first embodiment.

It is noted that the plush 33 may be removed by washing away the adhesive agent with the solvent instead of forcibly pulling the plush 33 out of the shell halves 30 and 31. If the plush 33 is adhered to the film passageway 23 with adhesive agent removable by washing with heated water, the plush 33 also can be washed away when the paper label 32 is washed away with heated water. If the material for molding the spool 4 is the same as that for molding the cassette shell 3, there is no need of removing the spool 4 so that the spool 4 can be treated together with the cassette shell 3.

Although the present invention has been fully described by way of the preferred embodiments thereof with reference to the accompanying drawings, various changes and modifications will be apparent to those having ordinary skill in this field. Therefore, unless such changes and modifications depart from the scope of the present invention, they should be construed as included therein.

What is claimed is:

1. A photographic film cassette comprising:
   a cassette shell made of resin, said cassette shell including two shell components each molded integrally, said two shell components comprising upper and lower shell halves joined together along a juncture;
   a spool on which a photographic film is wound and which is rotatably contained in said cassette shell;
   a port portion having a passageway for passing said film therethrough toward an outside of said cassette shell, said port portion including upper and lower covering members each attached to said upper and lower shell halves, respectively;
   a coupling means for removably attaching said port portion to said cassette shell, said coupling means comprising a first projection and a first recess each formed on said upper and lower covering members on lateral sides thereof, and a second recess and a second projection each formed on said upper and lower shell halves on lateral sides thereof for being coupled with each of said first projection and said first recess; and
   a light trapping member provided within said passageway for trapping light coming through said passageway, said light trapping member being affixed to said port portion so as to be removable therewith from said cassette shell.

2. A photographic film cassette as defined in claim 1, further comprising a literal indication recorded with ink on said cassette shell for indicating a type of said film.

3. A photographic film cassette as defined in claim 2, wherein said ink is soluble in methanol and washed away by washing said cassette shell with methanol.

4. A photographic film cassette as defined in claim 3, wherein said ink includes an acrylic resin.

5. A photographic film cassette as defined in claim 4, wherein said shell halves are held together by an ultrasonically welded seam.

6. A photographic film cassette as defined in claim 5, wherein said shell halves have a molded resin weld line on a center of said shell halves along a center circumference thereof, whereby said cassette shell is frangible along said weld line in order to allow removal of said spool out of said cassette shell from which said port portion is detached.

7. A photographic film cassette comprising:
   a cassette shell made of resin, said cassette shell including upper and lower shell halves joined together along a juncture;
   a spool on which a photographic film is wound and which is rotatably contained in said cassette shell;
   a port portion having a passageway for passing said film therethrough toward an outside of said cassette shell, said juncture passing through a center of an end of said spool and then following said passageway;
   a coupling means for removably attaching said port portion to said cassette shell, said coupling means being formed on lateral sides of said port portion and on lateral sides of said upper and lower shell halves; and
   a light trapping member attached to said passageway for trapping light coming through said passageway.

* * * * *